(No Model.)

O. F. SCHUMANN.
CURTAIN POLE AND FIXTURES.

No. 344,461. Patented June 29, 1886.

Witnesses
James M Halton

Inventor
Otto F. Schumann
By his Attorneys

UNITED STATES PATENT OFFICE.

OTTO FERDINAND SCHUMANN, OF BROOKLYN, NEW YORK.

CURTAIN POLE AND FIXTURE.

SPECIFICATION forming part of Letters Patent No. 344,461, dated June 29, 1886.

Application filed March 31, 1886. Serial No. 197,327. (No model.)

*To all whom it may concern:*

Be it known that I, OTTO F. SCHUMANN, a citizen of the United States, residing at Brooklyn, in the county of Kings and State of New York, have invented a new and useful Improvement in Curtain Poles and Fixtures, of which the following is a specification, reference being had to the accompanying drawings.

My invention relates to improvements in curtain poles and fixtures; and it consists of the peculiar and novel construction and combination of parts, substantially as hereinafter fully set forth, and particularly pointed out in the claims.

The present invention is especially designed as an improvement upon the device patented to me on the 16th day of June, 1885, by Letters Patent No. 320,094, and the object of my invention is primarily to simplify and improve the construction of the devices therein shown and to effect an economy in the manufacture of the same. In the patent above referred to I employ what are termed as "leading" rings, which are the middle rings of the portière, and these leading rings actuate the remaining or following rings in either direction, according as the cord is drawn to open or close the curtain. The carriages that support the leading and following rings out of contact with the curtain-pole are provided with bearing-rollers, which are adapted to come in contact with each other when the leading-ring carriage is operated by the cords and thus bind upon the pole, which is very objectionable. I overcome this defect by providing the carriages of each of the rings with guards or plates that inclose the rollers and prevent contact between the rollers of two adjacent carriages, thus allowing the rollers to remain free to slide on the pole. I also provide an improved form of sheave for preventing the accidental displacement of the operating-cord, and an improved plate for connecting or suspending the curtain from the ring, said plate being easily and readily removable from the curtain-ring, while at the same time it will securely retain its eye in engagement with the ring to prevent accidental displacement of the parts.

Figure 1:
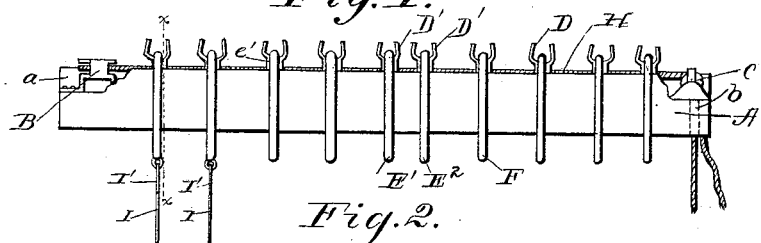
Figure 2:
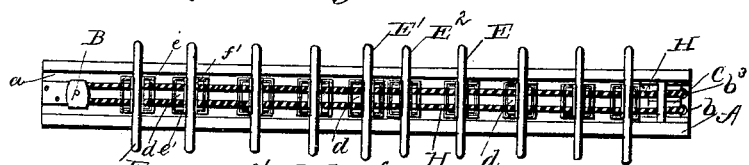
Figures 4, 5, 6:
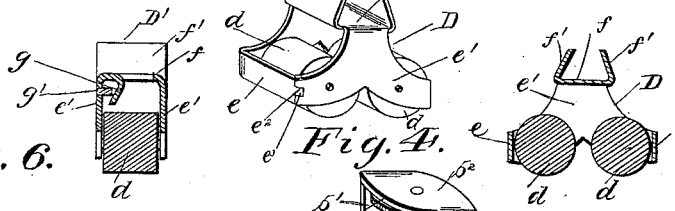
Figure 7:
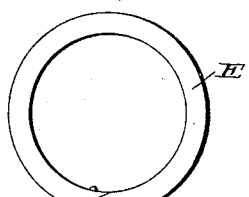
Figure 8:
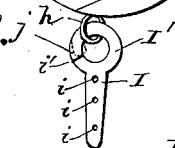
Figure 3:
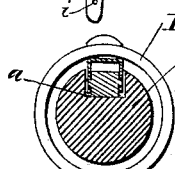

In the accompanying drawings, Figure 1 is a side elevation of my improved curtain pole and fixtures. Fig. 2 is a top plan view thereof, and Fig. 3 is a cross-sectional view through the curtain-pole, showing a ring and my improved carriage in front elevation. Fig. 4 is a perspective view of one of my improved "following" carriages, and Fig. 5 is a vertical longitudinal sectional view through the same. Fig. 6 is a vertical transverse sectional view through one of the leading carriages. Fig. 7 is a detached perspective view of my improved bracket and single sheave. Fig. 8 is a detached view of one of the rings having my improved plate for suspending the curtain therefrom.

Referring to the drawings, in which like letters of reference denote corresponding parts in all the figures, A designates the curtain-pole, which is preferably circular in cross-section and provided with a longitudinal groove, $a$, on its upper side, the side walls of the groove being arranged parallel with each other. In one end of the groove of the curtain-pole is secured a pulley, B, and in the opposite end is secured a double pulley, C. The pole is provided with transverse vertical openings $b\ b^3$, which are in line with the pulley C, as shown.

In Fig. 7 of the drawings my improved pulley B is provided with vertical side plates or guards, $b'$, which prevent the accidental displacement of the operating-cords. This single pulley is disposed so as to rotate in a horizontal plane, and the pin or shaft thereof is journaled in horizontal plates, $b^2$, of a bracket, B'. For the purpose of simplicity, durability, and cheapness, this bracket B' is made in one piece of sheet metal, the blank from which it is formed being cut or stamped by a suitable die. This bracket comprises the side and horizontal plates, $b'\ b^2$, hereinbefore described, and the lower plate, $b^2$, has an angular lip, $c$, depending therefrom at one side, and at the other side a vertical plate, $c'$, that carries a horizontal perforated plate, $c^2$. The horizontal plate $c^2$ and the lip $c$ lie on the same plane and bear against the bottom of the groove, and the bracket and its pulley is rigidly secured or held in place by screws or nails passed through the perforated plate $c^2$.

D designates the carriages that are arranged in the groove $a$ of the curtain-pole, and E the rings of the curtain, that are carried in the carriages and held thereby out of contact with the curtain-pole, to prevent binding thereon of said rings.

The rings lettered E' at the middle of the pole I term the "leading" rings and the carriages that support the rings are termed the "leading" carriages, which are lettered D'. The rings and carriages E D, that lie on opposite sides of the leading rings and carriages, are termed "following" rings and carriages.

The following and leading carriages are each provided at their ends with guards or plates $e$, that lie exteriorly to and out of contact with the rollers $d$, that support said carriages, thus leaving the rollers free to revolve, and preventing contact between the rollers of two adjacent carriages. Thus it will be seen that when the leading carriages E' E² are moved by the operating-cord the guards of said carriage will strike the guard-plate of the adjacent carriage, and thus hold the rollers out of contact, to permit them to rotate freely in performing their function. The carriages D are each formed or cut from a single piece of sheet metal by a suitable die and bent up into the proper form. The carriages are provided with side plates, $e$, which are curved, as shown, and have the pins or shafts of the rollers journaled in their ends, and on the ends thereof the guard-plates $e$ are formed, one end of one of said plates $e'$ having a recess or seat, $e^2$, in which is secured a nib or arm, $e^3$, of one of the guard-plates, as will be very readily seen. The upper reduced ends of the side or journal plates $e'$ are connected by an integral transverse plate, $f$, and the sides of this plate carry integral flanges $f'$, that are curved upwardly to retain the curtain-ring securely in place.

Each of the following carriages is provided with a ring that is supported out of contact with the curtain-pole, and the said following carriages are constructed in the manner above described. The leading carriages D' (shown in Fig. 6) are also constructed as above described, and in addition thereto the transverse plate $f$ has a lip, $g$, punched therefrom, which is bent downwardly and curved, and with a binding-screw, $g'$, that works in a threaded opening in one of the side or journal plates of said carriage, the operating-cord H being passed through the leading carriage and between the curved lip and the point of the binding-screw, the latter being adjusted to bear on the cord and clamp the same to the carriage and against the lip $g$. The cord H is passed through one of the openings $b$ of the pole and through one of the sheaves of the double pulley, then through the openings or frames of all of the follower-carriages E and the leader-carriages E' and E², and the cord is clamped to the latter carriage, E², by the binding-screw thereof, and passes freely through the opening of the follower-carriage E', then around the single sheave B at one end of the pole, and back through all the carriages, said cord being secured to the leader-carriage E' by the screw thereof, and passing freely through the fellow leader-carriage E² and the follower-carriages, and, finally, it is passed through the remaining sheave of the double pulley and through the opening $b^3$ of the pole to the required distance to the floor, after which the set-screws of the leader-carriages are adjusted to bind the cords against the lips thereof. By thus arranging or passing the operating-cord back and forth through all the carriages the follower-carriages are prevented from overturning or upsetting, the cord thus fulfilling two functions, which are important to the successful operation of this class of devices, one function being to operate the carriages and the other to prevent the overturning thereof. The operating-cord is clamped to the leader-carriages only and passes freely through the follower-carriages, and the latter carriages are operated or moved by the impact thereon of the leader-carriages.

I designates a depending plate, one of which is provided for each ring of the curtain-rings having the eyes $h$, and each of these plates is provided with two or more openings or perforations, $i$, which are arranged longitudinally thereon, and serve as means to secure one of the edges of the curtain thereto, and this plate is provided at its upper end with a split ring, I', the cut $i'$ therein being located at a point near the plate.

To secure the plate I to the eye of the ring, the yielding end $j$ of the split ring is first bent laterally to provide an opening for the passage of the eye, and the strain on the split ring is released to permit the yielding or spring portion to return to its normal position, which it retains, to prevent the plate from becoming accidentally detached.

Having thus fully described my invention, what I claim as new, and desire to secure by Letters Patent, is—

1. The combination, with the grooved pole, of the carriages having the guard-plates and the bearing-rollers inclosed within and out of contact with said guards, substantially as described.

2. A carriage for curtain-rings made from a single piece of sheet metal and comprising the journal-plates, the guards, a transverse plate connecting the journal-plates and the ring-retaining flanges, substantially as described.

3. A carriage for curtain-rings made from a single piece of sheet metal, and having the journal-plates, the guards, a transverse plate having a depending lip, the ring-retaining flanges, and a binding-screw adapted to clamp the operating-cord against the depending lip, substantially as described.

4. A pulley for curtain-poles, comprising a bracket formed of a single piece of sheet metal, and having the side or guard plates, $b'$, the plates $b^2$, connecting the plates $b'$, a depending lip, $c$, and the perforated plate $c^2$, connected to the lower plate, $b^2$, and a sheave journaled in the plates $b^2$, substantially as described.

5. The combination of a grooved pole, the follower and leader carriages movable longitudinally therein, and each having the guard-plates at its ends, which are adapted to abut against each other, and thus maintain their supporting-rollers out of contact with the carriages adjacent thereto, and the operating-cord passing through all the carriages and clamped to the leader-carriages only, substantially as described.

In testimony that I claim the foregoing as my own I have hereto affixed my signature in presence of two witnesses.

OTTO FERDINAND SCHUMANN.

Witnesses:
FERD F. SCHUMANN,
C. F. KUPRIAN.